United States Patent
Bartek et al.

(10) Patent No.: US 9,700,874 B2
(45) Date of Patent: Jul. 11, 2017

(54) METHOD OF PRODUCING MIXED METAL OXIDE CATALYST SYSTEM

(71) Applicant: KiOR, Inc., Pasadena, TX (US)

(72) Inventors: Robert Bartek, Centennial, CO (US); Michael Brady, Studio City, CA (US); Dennis Stamires, Dana Point, CA (US)

(73) Assignee: Inaeris Technologies, LLC, Pasadena, TX (US)

( * ) Notice: Subject to any disclaimer, the term of this patent is extended or adjusted under 35 U.S.C. 154(b) by 193 days.

(21) Appl. No.: 14/560,421

(22) Filed: Dec. 4, 2014

(65) Prior Publication Data

US 2015/0111723 A1 Apr. 23, 2015

Related U.S. Application Data

(63) Continuation of application No. 13/045,191, filed on Mar. 10, 2011, now Pat. No. 8,921,628.

(51) Int. Cl.

| | |
|---|---|
| *B01J 21/00* | (2006.01) |
| *B01J 21/16* | (2006.01) |
| *C10G 1/00* | (2006.01) |
| *C10G 3/00* | (2006.01) |
| *B01J 23/00* | (2006.01) |
| *C10L 1/08* | (2006.01) |
| *C10G 1/06* | (2006.01) |
| *C10G 1/08* | (2006.01) |
| *B01J 23/02* | (2006.01) |
| *B01J 23/06* | (2006.01) |
| *B01J 23/08* | (2006.01) |
| *B01J 23/10* | (2006.01) |
| *B01J 23/26* | (2006.01) |
| *B01J 23/34* | (2006.01) |
| *B01J 23/78* | (2006.01) |
| *B01J 27/18* | (2006.01) |
| *C10B 53/02* | (2006.01) |
| *C10B 57/06* | (2006.01) |

(52) U.S. Cl.
CPC ............ *B01J 21/16* (2013.01); *B01J 23/005* (2013.01); *B01J 23/02* (2013.01); *B01J 23/06* (2013.01); *B01J 23/08* (2013.01); *B01J 23/10* (2013.01); *B01J 23/26* (2013.01); *B01J 23/34* (2013.01); *B01J 23/78* (2013.01); *B01J 27/1806* (2013.01); *C10B 53/02* (2013.01); *C10B 57/06* (2013.01); *C10G 1/00* (2013.01); *C10G 1/06* (2013.01); *C10G 1/08* (2013.01); *C10G 3/44* (2013.01); *C10G 3/45* (2013.01); *C10G 3/50* (2013.01); *C10L 1/08* (2013.01); *B01J 21/005* (2013.01); *B01J 23/007* (2013.01); *C10G 2300/1011* (2013.01); *C10G 2300/1014* (2013.01); *Y02E 50/13* (2013.01); *Y02E 50/14* (2013.01); *Y02E 50/15* (2013.01); *Y02E 50/32* (2013.01); *Y02P 30/20* (2015.11); *Y02T 50/678* (2013.01)

(58) Field of Classification Search
CPC ........................................................ C10G 1/04
USPC ........ 502/243, 102–106; 423/213.2; 585/240
See application file for complete search history.

(56) References Cited

U.S. PATENT DOCUMENTS

| | | | | |
|---|---|---|---|---|
| 6,479,421 B1 * | 11/2002 | Vierheilig | ............... | B01J 21/10 502/80 |
| 6,524,996 B1 * | 2/2003 | Bender | .................. | B01J 23/005 502/346 |
| 7,347,929 B2 * | 3/2008 | Vierheilig | ............. | B01J 23/005 208/113 |
| 8,845,987 B1 * | 9/2014 | Nazarpoor | ............. | B01J 23/898 423/213.2 |
| 8,921,628 B2 * | 12/2014 | Bartek | ..................... | C10G 1/00 502/102 |
| 2009/0038441 A1 * | 2/2009 | McKenna | ............... | C22B 7/009 75/744 |
| 2015/0148216 A1 * | 5/2015 | Nazarpoor | ............. | B01J 23/005 502/74 |

* cited by examiner

*Primary Examiner* — Nina Bhat
(74) *Attorney, Agent, or Firm* — John Wilson Jones; Jones Delflache LLP

(57) ABSTRACT

A process for biomass catalytic cracking is disclosed herein. More specifically, the process is in presence of is a mixed metal oxide catalyst represented by the formula $(X_1O) \cdot (X_2O)_a \cdot (X_3Y_bO_4)$ wherein $X_1$, $X_2$ and $X_3$ are alkaline earth elements selected from the group of Mg, Ca, Be, Ba, and mixture thereof, and Y is a metal selected from the group of Al, Mn, Fe, Co, Ni, Cr, Ga, B, La, P and mixture thereof, wherein the catalyst is formed by calcining at least one compound comprising at least one alkaline earth element and a metal element.

20 Claims, No Drawings

METHOD OF PRODUCING MIXED METAL OXIDE CATALYST SYSTEM

RELATED APPLICATIONS

This application is a continuation of U.S. patent application Ser. No. 13/045,191, filed Mar. 10, 2011, the content of which is incorporated herein by reference in its entirety.

FIELD OF THE INVENTION

The invention relates to catalysts for use in catalytic process and more particularly to catalysts for use in a catalytic pyrolysis process or gasification of solid biomass material.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemicellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gasses such as hydrogen, which increases capital and operating costs), require expensive catalysts, suffer low conversion efficiency (e.g., incomplete conversion or inability to convert ligno-cellulosic and hemi-cellulosic material), and/or suffer poor product selectivity.

To date, a need remains for novel and improved processes for the conversion of solid biomass materials to produce fuels and specialty chemicals.

SUMMARY OF THE INVENTION

Aspects of the invention relates to a process for catalytic thermolysis of cellulosic biomass, the process comprising heating the cellulosic biomass to a conversion temperature in presence of a catalyst system, wherein the catalyst system comprises a mixed metal oxide catalyst represented by the formula $X_1O.(X_2O)_a(X_3Y_bO_4)$ wherein $X_1$, $X_2$ and $X_3$ are alkaline earth elements selected from the group of Mg, Ca, Be, Ba, and mixtures thereof, and Y is a metal selected from the group of Al, Mn, Fe, Co, Ni, Cr, Ga, B, La, P and mixtures thereof. In some embodiments a can be 0 or 1, b can be 1 or 2. In preferred embodiments, the catalyst system is formed by calcining one or more compounds comprising an element selected from the group including alkaline earth element and metal element. $X_1$, $X_2$, and $X_3$ can be the same element or different elements. In some embodiments, the compound comprises at least one earth element and aluminum and is an anionic or a cationic clay. For example, anionic clay is hydrotalcite or hydrotalcite-like compound. In an exemplary embodiment, cationic clay is selected from the group including smectite, bentonite, kaolin and mixtures thereof.

In some embodiments, the alkaline earth element X is Ca or Mg and the metal element Y is Al. For example, the catalyst comprises a mixed oxide which is represented by the formula $CaO.MgO.(MgAl_2O_4)$.

In some embodiments, the thermolysis is performed in presence of hydrogen. In some embodiments, the thermolysis is performed in presence of steam and or in presence of recycled gaseous products.

In some embodiments, the catalyst system is formed from at least two compounds, wherein the first compound comprising the X element is a first metal oxide precursor and the second compound comprising the Y element is a second metal oxide precursor. The first and second metal oxide precursor are each separately selected from the group of metal oxide, metal hydroxide, metal hydroxycarbonate, metal carbonate and combinations thereof. In some embodiments, the at least two compounds are mixed to form an intermediate mixture and wherein the intermediate mixture is homogeneous.

In some embodiments, the at least one compound is calcined at a temperature of about 900° C. In preferred embodiments, the catalyst comprises spinels. Spinels may be characterized by the X to Y molar ratio. For example, the X to Y molar ratio is between 1:1 and 10:1. Spinels may be characterized by a X-ray diffraction peak located at the 2-θ region.

In some embodiments, the clay is impregnated with a calcium containing compound forming an intermediate mixture and wherein the intermediate mixture is calcined at about 1000° C.

In some embodiments, the catalyst is formed from at least two compounds, wherein the first compound is a magnesium source and the second compound is an aluminum source. The aluminum source can be bauxite, gibbsite or boehmite. Other aluminum sources can be spent Fluid Catalytic Cracking Catalyst, or equilibrium Catalytic Fluid Cracking Catalyst. The magnesium source can be magnesite ore, brucite, bentonite, dolomite or dawsonite.

In some embodiments, the catalyst system or at least part of the catalyst acts as a heat carrier. In other embodiments, a heat carrier is added to the cellulosic biomass. In some embodiments, the cellulosic biomass is contacted with the catalyst system in a pretreatment step. The pretreatment step comprises forming a biomass-catalysts system mixture and treating the mixture by thermal treatment, hydro-thermal treatment, torrefaction, mechanical treatment, swelling, steam explosion, precipitation, or any combinations thereof. The mechanical treatment comprises milling, grinding, kneading or any combinations thereof. In some embodiments, the catalyst system is on a refractory support. In some embodiments, the pre-treatment is performed at an elevated temperature and/or an elevated pressure.

In some embodiments, the catalytic process is in presence of hydrogen.

In some aspects, the invention relates to a process for catalytic hydropyrolysis of cellulosic biomass, the process comprising heating the cellulosic biomass to a conversion temperature in presence of hydrogen and in presence of a catalyst system wherein the catalyst system comprises a mixed metal oxide represented by the formula $(X_1O).(X_2O) a.(X_3Y_bO_4)$ wherein $X_1$, $X_2$ and $X_3$ are alkaline earth elements selected from the group of Mg, Ca, Be, Ba, and mixtures thereof, and Y is a metal selected from the group of Al, Mn, Fe, Co, Ni, Cr, Ga, B, La, P, Ti, Zn and mixtures thereof, wherein a is 0 or 1 and b is 0, 1 or 2. In some embodiments, the process is performed in an inert atmosphere such as in presence of nitrogen and/or in presence of carbon monoxide or carbon dioxide.

DETAILED DESCRIPTION OF THE INVENTION

Aspects of the invention relate to methods, apparatus, kits and compositions for converting solid biomass into fuels and/or specialty chemicals. Suitable biomasses, or biomass materials, can include any biological material derived from living, or previously living, organisms. In more particularity, non-limiting examples of biomasses suitable for use in the process described herein can include inedible materials, which do not compete with the food supply, as well as materials that can be easily grown, or materials that are otherwise readily available, such as: grasses (including, for example, switch grass), saw dust, wood chips, wood bark, twigs, straw, corn stover, cotton linters, bagasse, and the like. In various embodiments, biomasses include materials of photosynthetic origin (e.g., plants), having such as, for example, materials made predominately of cellulose, hemicellulose, or lignin.

Some aspects of the invention relate to apparatuses for practicing the process. Other aspects of the invention relate to kits for practicing the process and operating the apparatuses. In some embodiments, kits include an apparatus and instructions for operating the apparatus.

Aspects of the invention relate to pyrolysis processes for converting solid biomass to a bio-oil or gas in the presence of catalysts. In general, pyrolysis of biomass material can be carried out thermally, in the absence of a catalyst or in presence of a catalyst. Pyrolysis processes produce gaseous products ($CO_2$, CO, $CH_4$, $H_2$ and $C_2H_4$), liquid products (pyrolysis oil or bio-oil) a solid product (coke, char and ash). Pyrolysis processes can be modified as to produce less char and coke and more valuable products such as liquid products or valuable gas products. The bio-oil may be converted to suitable liquid transportation fuels in modified refinery processes such as fluid catalytic cracking, hydroconversion, thermal conversion, and the like. In these processes the bio-oil may be the sole feedstock, or it may be blended with conventional, crude oil-based feedstocks. Examples of valuable liquid products include fuel such as jet fuels, diesel, heating oil. Example of valuable gas include ethane, propane, and butane.

Aspects of the invention relate to a process for catalytic pyrolysis of cellulosic biomass, the process comprising heating the cellulosic biomass to a conversion temperature in presence of the catalyst system. In general, increasing the liquid yield of biomass pyrolysis processes required fast heating rate, a short reaction time and a rapid quench of the liquid reaction products. Fluidized bed reactors with fast heating rates have been proposed for biomass pyrolysis processes. In some case, heat is provided by injecting hot particulate heat transfer medium (e.g., char, sand) particles into the reactor.

Aspects of the invention relate to a catalytic process of treating the biomass or particulate biomass. In some embodiments, the use of suitable catalysts leads to an increase of the yield of organic compounds usable as a fuel, feedstock, specialty chemical and a reduction of the yield of undesirable products such as coke, tar and unconverted biomass.

Aspects of the invention relate to the process for producing fuel from biomass using hydropyrolysis. Hydropyrolysis is defined herein as pyrolysis in presence of externally supplied hydrogen ($H_2$). In some embodiments, a process of fast pyrolysis or hydropyrolysis is used wherein hydrogen is introduced during the pyrolysis step. In some embodiments, hydrogen needed for the hydropyrolysis is derived from methane, gasification of biomass or refinery feedstocks. Yet in other embodiments, hydrogen is derived form a carbon-free hydrogen energy source (e.g. water).

Without limitation, suitable units may include, for example, pyrolysis and hydropyrolysis reactors. The reactor(s) may be operated at any suitable temperature. In some instances, it may be desirable to operate the reactor at relatively high temperatures. For example, the reactor may be operated at temperatures of at least about 300° C., at least about 400° C., at least about 500° C., at least about 600° C., at least about 700° C. at least about 800° C., at least about 900° C., or at least about 1000° C. In some embodiments, the reactor may be operated at temperatures between 500° C. and 1000° C., between 525° C. and about 800° C., between 550° C. and 700° C., or between 575° C. and 650° C. In other embodiments, the reactor may be operated between about 500° C. and about 600° C.

In some aspects of the invention, the process includes preparing solid biomass for catalytic conversion, which can improve conversion of the biomass into fuels. In some embodiments, it is advantageous to subject the biomass to a pre-treatment such as thermal treatment, hydro-thermal treatment, torrefaction, swelling of the biomass, impregnation, precipitation, adsorption, co-milling, steam explosion, etc. For example, it can be advantageous to heat the solid biomass or particulate biomass at an elevated temperature above the ambient temperature. Heating should however be moderate to avoid or minimize biomass conversion at this stage of the process. For example, suitable temperatures are from about 45° C. to about 300° C. It is also further desirable to carry out at least part of the pretreatment under elevated pressure (above atmospheric pressure). Pressure may be applied by adding a gas, in particular a gas that is oxygen-poor (i.e. having a lower content than air) or substantially oxygen-free.

In some embodiments, the process includes pre-treating the biomass prior to interacting the biomass with the catalyst. For example, pre-treating can include biomass size reduction to generate particulate biomass.

In some embodiments the catalyst system or part of the catalyst system acts as a heat carrier. Yet in other embodiments, a heat carrier is added to the catalyst system. In an embodiment, the heat carrier may be an inert material, such as, for example, sand.

Aspects of the invention relate to compositions and to the use of mixed metal oxides and spinels compositions as a heat carrier in reactors to produce bio-oil, coke/char and/or light gases. Other aspects of the invention relate to process to produce such compositions. In some embodiments, the combination of alkaline earth element with transition or other metal oxides are thermally treated at elevated temperatures to exhibit suitable thermal properties, such as heat capacity and conductivity, which are useful as heat transfer media for use in pyrolysis or hydropyrolysis and gasification reactions of biomass. In some embodiments, at least one alkaline earth element selected form the group of Ca, Mg, Be, Ba and mixtures thereof. The transition metal (Tm) represents at least one metal selected from Ti, V, Cr, Mn, Fe, Co, Ni, Cu and Zn. Other metal are selected form the group of Al, Ga, In, and Tl. In some embodiments, the mixed-metal oxides and/or spinels have catalytic properties that influence the yield and quality of the bio-oil produced. The term "mixed oxide" refers to chemical compound formed from at least two oxides of different metals. Preferably, the mixed metal oxide catalysts have refractory properties such as the catalysts are chemically and physically stable at high temperatures. The refractory properties of the mixed metal oxides and/or spinels depend on the proportion and particle size distribution of the charge thus regulating the kinetics of the chemical reactions. Aluminum oxides (i.e., alumina), magnesium oxides (i.e., magnesia), silicon oxides (i.e., silica) and calcium oxides (i.e., lime) have suitable materials for the production of material having refractory properties.

In other embodiments, the mixed metal oxides and/or spinels exhibit mild catalytic activity which is useful to catalytically react some of the vapors generated during thermolysis of biomass. The mixed-metal oxides and/or spinels can be used in physical mixtures with other heat transferring media or catalysts. In preferred embodiments, the mixed-metal oxides and/or spinels are used in fluidized bed, ebullating bed, fixed bed and other types of reactors. As used herein, the term "catalyst" refers to any material that facilitates the conversion of organic components of the biomass into bio-oils, fuels, specialty chemicals or precursors thereof.

In some embodiments, the mixed metal oxides and/or spinels are applied to biomass or treated biomass. For example, in some embodiments, the mixed metal oxides and/or spinel composition is used with biomass that has been previously subjected to a pre-treatment such as thermotreatment, hydro-thermo-treatment, torrefaction, swelling of the biomass, impregnation, precipitation, adsorption, co-milling, steam explosion, etc.

Preparation of Binary Mixed Metal Oxide Compositions

Mixed-metal oxides (MMOs) refer to chemical compound formed from at least two oxides of different metals. In some embodiments, the mixed-metal oxides are formed from binary systems, i.e., systems including two metal oxides. In some embodiments, clays are used as binary systems for the production of mixed-metal oxides. For example, Mg—Al hydrotalcites clays may be used. In some embodiments, suitable clays are subjected to high temperatures (i.e., calcined) to convert the crystalline structure to a solid solution of mixed-metal oxides. The resulting crystalline form of the solid mixed-metal oxides can be identified with Powder X-ray Diffraction (or PXRD). In some embodiments, the solid-solution of mixed metal oxides exhibits different Powder X-ray Diffraction patterns. In some embodiments, the mixed-metal oxides are converted to spinels. In some cases, different kinds of spinels are formed.

In some embodiments, the clays or modified clays are subjected to a calcining or calcination treatment. Calcination is a thermal treatment process which usually takes place at temperatures below the melting point of the product materials also referred herein as calcine. In general, calcination leads to the decomposition of hydrated minerals to remove at least part of the water as water vapor as well as to effect phase transformations, or drive off carbon dioxide in carbonate materials. Calcining generally involves heating the material, for a short period of time (e.g., flash calcination) or for several hours or days. It may be carried out in air or in special atmosphere such as steam, nitrogen or a noble gas. In some embodiments, the heating step is performed in presence of recycled gaseous products. In other embodiments, the heating step is performed in presence of carbon monoxide or carbon dioxide.

Calcining can be used to remove water and create pores structure. Calcination can be carried out at temperatures of at least 400° C., at least 500° C., at least 600° C. Mild calcination at temperature less than 600° C. may result in material that is rehydratable. In some embodiments, the clay is subjected to temperatures of at least 600° C., to convert the clay into a calcined clay form that is not re-hydratable.

Calcination at very high temperatures may result in chemical and/or morphological modifications of the material being calcinated. Calcination processes aiming at chemical and/or morphological modifications of the material being calcinated require high calcination temperatures, for example at least 700° C., at least 800° C., or at least 900° C., at least 1000° C., at least 1100° C., or at least 1200° C. Calcination at high temperatures allows, for example, divalent metal ions to be transformed to its metal oxide or to react with, for example, alumina to form a mixed metal oxide. In some embodiments, calcination will convert material into a rehydratable mixed metal oxide (solid solution) or, at higher temperatures, into a spinel-type oxide. As used herein, the term "spinel" refers to mineral having the general formula $A^{2+}B_2^{3+}O_4^{2-}$ wherein A and B can be divalent, trivalent, tetravalent ions. For example, carbonates may be converted to oxides, and mixed metal oxides (MMO) may be converted to a spinel phase.

Suitable clay materials include cationic and anionic clays, for example smectite, bentonite, sepiolite, atapulgite, hydrotalcite and the like. Hydrotalcites are layered double hydroxides (LDH) comprising divalent ions such as Mg, Ca, Zn or Ni, and trivalent ions such as Al, Fe, Cr. Suitable hydrotalcites include mixed metal oxides and hydroxides having a hydrotalcite structure and metal hydroxyl salts. Thermal treatments of hydrotalcites induce dehydration, dehydroxylation and loss of charge-compensating anions, resulting in mixed oxides with the MgO-type structure. Other clay materials include smectite clays. Smectite clays include montmorillonite (MO), beidellite, saponite, bentonite and mixture thereof. Smectites clays have a chemical composition comprising tetravalent cations (Si), trivalent cations (Al and/or Fe), O and H. As an example, the formula of smectite clay is $Al_2O_3 4SiO_2 H_2O$. Smectite clays have a variable net negative charge which is balanced by divalent cations, e.g., Ca, Mg and/or monovalent cations e.g., Na, Li and/or H. For example, there are different types of bentonites and their names depend on the dominant elements, such as potassium (K), sodium (Na), calcium (Ca), magnesium (Mg), Calcium-magnesium (Ca—Mg) and aluminum (Al). The structure, chemical composition, exchangeable ion type and small crystal size of smectite and bentonite clays are responsible for several unique properties, including a large chemically active surface area, a high cation exchange capacity, and interlamellar surfaces. Where Na is the predominant exchangeable ion, smectite clays may have a high swelling capacity (referred herein as "swelling" clays). In contrast, where Ca and Mg are the predominant exchangeable ions, smectite clays have only a small degree of swelling (referred herein as "non-swelling" clays).

In some embodiments, clays are pre-treated, modified or restructured before being used as a catalyst. Pre-treatment may include drying, extraction, washing, subjecting to ion-exchange, calcining or a combination thereof. In preferred embodiments, the clay catalyst precursor are modified to produce a catalyst with higher selectivity and/or efficiency. In exemplary embodiments, the clay precursors are modified by incorporating different metal cations or molecules to produce a catalyst with higher selectivity and/or efficiency.

In some embodiments, binary mixed-metal oxide compositions are formed using two metal precursors. In one embodiment, the metal precursor is a metal salt or a mixture selected from nitrates, hydrated nitrates, chlorides, hydrated chlorides, sulfates, hydrated sulfates, formates, acetates, hypophosphites, and mixtures thereof in solution. In an exemplary embodiment, binary metal oxides are formed by mixing two metal oxides, metal hydroxides, metal hydroxy-carbonates, metal carbonates in homogeneous mixtures.

In some embodiments, rare earth oxides are combined with transition metals or other metals oxides. In some embodiments, at least one alkaline earth element is selected form the group of Ca, Mg, Be, Ba and mixture thereof. The transition metal (Tm) represents at least one metal selected from Ti, V, Cr, Mn, Fe, Co, Ni, Cu and Zn. Other metal are selected form the group of Al, Ga, In, and Tl. Mixing includes the processes of milling, either dry or wet, pulverizing, blending or like processes. In other embodiments, solutions including the mixed oxides are mixed. The mixture, containing the appropriate metal oxides ratio to form the desired composition, is then subjected to calcination at high temperatures as described above. In another embodiment, the binary mixed-metal oxides are formed by co-precipitating two metal salts to form mixed-metal oxides. In some other embodiments, the binary mixed-metal oxide are formed by precipitating a precursor of a metal oxide on another metal oxide. For example, Mg—Al mixed metal oxide is formed by precipitating magnesium hydroxide $Mg(OH)_2$ on an aluminium oxide.

In one embodiment, a binder is optionally included in the process for making the catalyst. Generally, the binder material has less catalytic activity than the catalyst composition (without the binder material) or no catalytic activity at all. Adding a binder material may reduce the activity of the catalyst composition. Therefore, the amount of binder material to be added depends on the desired activity of the final catalyst composition. Binder amounts from 0 weight percent to 95 weight percent or 0.5 weight percent to 75 weight percent of the total composition can be suitable, depending on the envisaged catalytic application.

The binder materials can be added to the metal precursors either simultaneously or one after the other. Alternatively, the metal precursors can be combined together and subsequently a binder material can be added to the combined metal precursors.

Preparation of Tertiary Mixed Metal Oxide Compositions

Tertiary mixed metal oxides can be formed using a similar process as used for the formation of binary mixed metal oxides. In one embodiment, the tertiary mixed-metal oxides are formed by homogeneously mixing solid metal oxides, metal hydroxides, metal carbonates, metal hydrocarbonates, metal phosphates or combinations thereof and subjecting the mixture to calcination as discussed above.

In another embodiment, three or more metal hydroxides are co-precipitated to form tertiary mixed-metal oxides. In another embodiment, at least one mixed-metal oxide precursor is precipitated on a different metal oxide precursor or metal oxide.

In some other embodiments, tertiary metal oxides are formed by mixing one or more crystalline material containing metal oxide precursors with one or more non-crystalline metal oxides and/or metal oxide precursors. Yet in other embodiments, tertiary metal oxides are formed by mixing one or more crystalline metal oxide precursors and subsequently subjecting the mixture to calcination.

Refractory Materials Containing Spinels or Mixed-Spinels

Some aspects of the invention relate to the formation of mixed-metal oxides solid-solutions compositions containing spinels. Spinels are represented by the general formula $X^{2+}.Y^{3+}O_4$ wherein $X^{2+}$ represents a divalent alkaline earth or transition metal and $Y^{3+}$ represents a trivalent transition metal. For example, $X^{2+}$ can be selected from the group consisting of Mg, Ca, Ba, Sr, Zn, Mn, Co, Ni, and Cu and $Y^{3+}$ can be selected from the group of consisting of Al, Mn, Fe, Co, Ni, Cr, Ga, B, La, and P.

In some embodiments, mixed-metal oxides solid-solutions compositions containing mixed spinels having the general formula $X_1^{2+}.X_2^{2+}.Y^{3+}O_4$ are formed wherein $X_1^{2+}$ represents one divalent metal and $X_2^{2+}$ represents a different divalent metal. Generally, solid solutions comprising spinels can be represented by the general formula $X_1^{2+}O.X_2^{2+}.Y^{3+}O_4$. In some embodiments, the molar ratio of the $X^{2+}$ to $Y^{3+}$ in such spinel compositions is between 1:1 and 10:1 or between 8:1 and 5:1. The X-ray diffraction major peaks of the spinel phase are located at a 2-θ angle ranging between 35° to 68°.

Preferred spinel compositions contain magnesium or calcium and aluminium. For example, preferred spinels compositions formula are $MgO.(MgAl_2O_4)$ or $CaO.(MgAl_2O_4)$. Preferred mixed spinel compositions formulas are $CaO.MgO.(MgAl_2O_4)$.

In some embodiments, spinels can be formed by heat treating natural clays containing divalent metals and alumina. Suitable clays include smectite, bentonite, sepiolite, montmorillonite and mixtures thereof. In general, the divalent metal reacts with the aluminum to form the spinel phase such as $CaAl_2O_4$ or $MgAl_2O_4$ while the rest of the material contains silica, silica-alumina and/or transition phase alumina.

In other embodiments, suitable clays include the kaolinite group of clay, such as kaolin which contains silica and alumina. In some embodiments, the kaolinite clay is contacted with a divalent metal compound, for example, a magnesium compound or a calcium compound and subjected to calcination. Examples of magnesium compounds include $MgO$, $Mg(OH)_2$, $MgCO_3$ and the like. Examples of calcium compounds include $CaO$, $Ca(OH)_2$, $CaCO_3$ and the like. In some embodiments, under calcination conditions, the divalent metal reacts with the aluminium to form a spinel phase ($X^{2+}.Y^{3+}O_4$) within the remaining silica-alumina phase.

In other embodiments, anionic clays such as hydrotalcite clays and synthetic hydrotalcite-like clays are used. Hydrotalcite clays and synthetic hydrotalcite-like clays are part of the Layered Double Hydroxy clays (LDH) and are generally represented by the formula:

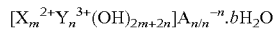
$$[X_m^{2+}Y_n^{3+}(OH)_{2m+2n}]A_{n/n}^{-n} \cdot bH_2O$$

In some embodiments, the Layered Double Hydroxy clays are calcined at temperatures of at least 800° C., at least 900° C. or at least 1000° C. to form solid-solution containing metal spinels. In preferred embodiments, $X^2$ is Mg, and the magnesium-aluminium spinel $MgAl_2O_4$ is formed as well as an Mg-rich and/or Al-rich solid solution phase.

In some embodiments, the Layered Double Hydroxy clays are impregnated with a calcium salt compound and then subjected to calcination conditions at temperature of about 1000° C. to produce mixed-metal spinels and mixed-metal solid solutions containing $Ca/Mg.O[Ca/Mg.Al_2O_4]$. By varying the mole ratios of the metals, the amount and the compositions of both the spinel and the solid solution phases mixtures can be varied.

In other embodiments, the Layered Double Hydroxy clays are impregnated with a magnesium containing compound or are impregnated with a combination of calcium and magnesium and then subjected to calcination conditions.

It is advantageous to prepare refractory metal solid solutions and spinels from low cost materials. Bauxite ore or gibbsite can be use as a source of aluminum. Magnesite ore, magnesium hydroxycarbonate, brucite $(Mg(OH)_2)$, magnesium carbonate, dawsonite, bentonite, dolomite or magnesium oxide can be used as a source of magnesium. Bauxite or red mud, gibbsite or boehmite can be used as source of low cost aluminum. Boehmite is an aluminum oxide hydroxide ($\gamma$-AlO(OH)) mineral, a component of the aluminum ore bauxite. Other source of low cost aluminum are spent catalysts containing alumina components, such as Fluid Catalytic Cracking Catalyst (FCC) spent/E-cat materials. For example, an Equilibrium FCC catalyst which contains alumina is contacted with a magnesium source (soluble or insoluble) and calcined at high temperature to allow the magnesium to interact with the alumina in the Equilibrium catalyst (Ecat) to form a spinel phase. Preferably, low metal (Ni and V) containing E-cats are used. Yet, in some embodiments, the metals are leached out prior to reacting with the magnesium source to avoid undesirable side reactions and products during pyrolysis, such as gas and coke. In other embodiments, the metals are passivated or "buried" as part of the sintering process.

In some embodiments, refractory metal oxide solid-solutions and spinels are prepared from solution of magnesium and aluminum salts by co-precipitation followed by calcination Soluble salts of aluminum, such as aluminum sulfate, aluminum nitrate, sodium aluminate, etc. can be used together with soluble salts of magnesium, such as magnesium nitrate, and the like. Generally, during mixing, the pH is adjusted with a base to precipitate the metals as hydroxides or hydroxycarbonates. The formed gel is dried and calcined at higher temperature to form the mixed metal solid-solution and spinel composition.

In some embodiments, mixed-metal oxide solid-solutions and spinel are formed on refractory supports. Examples of materials used in this process involve, but are not limited to, shaped-bodies (e.g., microspheres, pellets, etc.) of FCC catalysts, equilibrium catalysts, calcined clay shaped-bodies and the like.

In some embodiments, kaolin-containing microspheres or powder produced by calcination are treated with an acid solution to leach out at least part of the alumina content from the structure. The aluminum salts formed in the solution remains in contact with the solid clay and are precipitated on the leached clay by the addition of magnesium oxide, hydroxide or carbonate, and, optionally a base solution. Subsequently, the composite is dried and calcined to form a solid-solution/spinel of Mg/Al oxide which is deposited on the leached (shaped bodies) of the clay.

Other sources of low cost alumina include used catalysts that contain alumina components. For example, equilibrium FCC catalysts that contain alumina can be treated with an acid solution to leach out at least part of its alumina content as a soluble aluminum salt. A basic magnesium source can be added to the aluminum salt solution (in contact with the leached catalyst, such as MgO), to precipitate an Mg/Al mixed hydroxide on the leached catalyst shaped bodies. Such composite is then calcined at elevated temperature to form a mixed-metal solid-solution/spinel on the leached catalyst particle or shaped body. In some embodiments, a mixture (50:50 equal molar) of a magnesium and calcium sources is added to precipitate a mixed Ca/Mg metal hydroxide composite on the leached particles, which are then calcined at high temperature to form the mixed-metal oxide solid-solution on the particles.

In another embodiment, the spent FCC catalyst or FCC/Additive is calcined at higher temperature than the temperature it has been exposed to during residence in the Fluid Cracking Catalyst Unit regenerator (FCCU) to form the mixed-metal oxide solid-solution and spinel. Subsequently, the calcined spent catalyst (Equilibrium catalyst) is leached with an acid solution and the dissolved alumina is precipitated with MgO, $MgCO_3$, etc. In some cases, an additional base, such as caustic base is required to completely precipitate the alumina. Alternatively, the Mg source is replaced with a calcium source and the final product is calcined.

In other embodiments, the process involves the calcination of the spent FCC catalyst or FCC/Additive mixture at a temperature which is higher than that the catalyst has been exposed to in the FCCU regenerator. The calcined catalyst is then impregnated, coated or mixed with a magnesium oxide, hydroxide, hydroxycarbonate or a salt of magnesium and subsequently calcined.

Alternatively, the magnesium source is replaced with a calcium source and then the catalyst bearing the calcium is calcined. Yet in another embodiment, mixtures of Mg and Ca are used in contacting the leached Spent (or Equilibrium) as described above.

In some embodiments, the Spent or E-cats are leached with a base solution, such as NaOH and the Mg, Ca or mixtures thereof are impregnated, coated or mixed and then calcined at higher temperatures sufficient to allow the formation of Mg, Ca, Al, Si mixed-metal oxide solid-solutions and spinels.

In some embodiments, the process involves the treatment of an equilibrium FCC catalyst with a base solution to leach out at least part of the silica content and activate the alumina present in the catalyst. After the removal of the silicate, a magnesium source is added to the leached catalyst, such as a magnesium salt, and subsequently calcined at higher temperature to allow the magnesium to interact with the aluminum to form a mixed oxide solid-solution supported on the leached catalyst particles.

In other embodiments, the acid leached catalyst is mixed with a calcium salt, and subsequently calcined at higher temperature to allow the calcium to interact with the aluminum to form a mixed oxide solid-solution supported on the leached catalyst particles.

In some embodiments, the process involves the treatment of calcined kaolin microspheres with a caustic base to leach out at least part of the silica content and activate the remaining alumina in the particle. A magnesium source is then added source to form Mg/Al mixed oxide solid-solution. Alternatively, a calcium source is added to form Ca/Al mixed oxide solid-solution.

The present invention provides among other things mixed metal oxides, refractory mixed-metal oxides and spinel compositions for thermo-catalytic conversion of biomass.

While specific embodiments of the subject invention have been discussed, the above specification is illustrative and not restrictive. Many variations of the invention will be come apparent to those skilled in the art upon review of this specification. The full scope of the invention should be determined by reference to the claims, along with their full scope of equivalents, and the specification, along with such variations.

The invention claimed is:

1. A method of making a catalyst, the method comprising:
   (a) combining one or more compounds comprising an element selected from the group including alkaline earth element X and a metal element Y, wherein X is selected from the group consisting of Mg, Ca, Be, and Ba and combinations thereof, and Y is selected from the group consisting of Al, Mn, Fe, Co, Ni, Cr, Ga, B, La, P, Ti, and Zn and combinations thereof,
   (b) mixing the one or more compounds to form a mixture; and
   (c) calcining the mixture thereby forming a catalyst system,
   wherein the catalyst system comprises a composition represented by the formula $(X_1O).(X_2O)_a.(X_3Y_bO_4)$, wherein $X_1$, $X_2$ and $X_3$ are alkaline earth elements selected from the group consisting of Mg, Ca, Be, and Ba and mixtures thereof, and wherein a is 0 or 1 and b is 0, 1 or 2.

2. A method of forming a catalyst system, the method comprising:
   (a) combining one or more compounds comprising an element selected from the group including alkaline earth element X and a metal element Y, wherein X is selected from the group consisting of Mg, Ca, Be, and Ba and combinations thereof, and Y is selected from the group consisting of Al, Mn, Fe, Co, Ni, Cr, Ga, B, La, P, Ti, and Zn and combinations thereof, and
   (b) precipitating the one or more compounds, thereby forming a catalyst system, wherein the catalyst system comprises a composition represented by the formula $(X_1O).(X_2O)_a.(X_3Y_bO_4)$, wherein $X_1$, $X_2$ and $X_3$ are alkaline earth elements selected from the group consisting of Mg, Ca, Be and Ba and mixtures thereof, and wherein a is 0 or 1 and b is 0, 1 or 2.

3. The method of claim 1 wherein the catalyst system is formed on a refractory support.

4. The method of claim 1 wherein the catalyst system comprises mixed metal oxides, refractory mixed metal oxides, spinels, mixed spinels or combinations thereof.

5. The method of claim 1 wherein $X_1$, $X_2$ and $X_3$ represent the same element or wherein $X_1$ is a different element than $X_2$ and $X_3$.

6. The method of claim 4 wherein the catalyst system comprises mixed metal oxides represented by the formula $CaO.MgO.(MgAl_2O_4)$ spinels represented by the formula $MgO.(MgAl_2O_4)$, $CaO$ $(MgAl_2O_4)$, or a combination thereof.

7. The method of claim 1 wherein the step of mixing comprises dry milling, wet milling, pulverizing, or blending.

8. The method of claim 1 wherein, in the step of mixing, a solution of mixed oxide is added.

9. The method of claim 1 wherein the step of combining comprises combining at least two compounds, wherein the first compound comprising the element X is a first metal oxide precursor and wherein the second compound comprising the metal element Y is a second metal oxide precursor.

10. The method of claim 9 wherein the first and second metal oxide precursors are each separately selected from the group consisting of metal oxide, metal hydroxide, metal hydroxycarbonate, and metal carbonate, and combinations thereof.

11. The method of claim 1 wherein, in the step of mixing, the at least two compounds are mixed to form an intermediate mixture and wherein the intermediate mixture is homogeneous.

12. The method of claim 1 wherein, in the step of calcining, the one or more compounds are calcined at a temperature of at least about 900° C.

13. The method of claim 1 wherein the catalyst system is formed from at least a first compound and a second compound, wherein the first compound is a calcium source and the second compound is an aluminum source.

14. The method of claim 1 wherein the catalyst system is formed from at least a first, a second and a third compound, wherein the first compound is a calcium source, the second compound is a magnesium source and the third compound is an aluminum source.

15. The method of claim 13 wherein the aluminum source is selected from the group consisting of spent Fluid Catalytic Cracking Catalyst, equilibrium Fluid Cracking Catalyst, bauxite, gibbsite and bohemite and wherein the magnesium source is magnesite ore, brucite, dawsonite, bentonite, and dolomite and combinations thereof.

16. A method of forming a catalyst system, the method comprising calcining an anionic or cationic clay comprising at least one alkaline earth element and aluminum at a temperature of at least about 900° C., thereby forming a catalyst system, wherein the catalyst system comprises a composition represented by the formula $(X_1O).(X_2O)_a.(X_3AlO_4)$ wherein $X_1$, $X_2$ and $X_3$ are alkaline earth elements selected from the group consisting of Mg, Ca, Be, and Ba and mixtures thereof, and wherein a is 0 or 1.

17. The method of claim 16 further comprising subjecting the clay to a pretreatment before the calcining step, wherein the clay is subjected to drying, extraction, washing, ion exchange, calcination or combinations thereof.

18. The method of claim 16 wherein the anionic clay is hydrotalcite or hydrotalcite-like compound or wherein the cationic clay is selected from the group including smectite, bentonite and kaolin, and combinations thereof.

19. The method of claim 16 wherein the clay is impregnated with a calcium-containing compound or magnesium-containing compound or a magnesium and calcium-containing compound forming an intermediate mixture and wherein the intermediate mixture is calcined at about 1000° C.

20. The method of claim 16 wherein the catalyst system comprises mixed metal oxides, refractory mixed metal oxides, spinels, mixed spinels or combinations thereof.

* * * * *